United States Patent
Wilhelmsson et al.

(10) Patent No.: US 10,506,519 B2
(45) Date of Patent: Dec. 10, 2019

(54) MITIGATION OF UPLINK/DOWNLINK ASSYMETRY

(71) Applicant: Telefonaktiebolaget LM Ericsson (publ), Stockholm (SE)

(72) Inventors: Leif Wilhelmsson, Dalby (SE); Dzevdan Kapetanovic, Lund (SE); Bengt Lindoff, Bjarred (SE); Thomas Nilsson, Malmo (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 15/757,842

(22) PCT Filed: Sep. 7, 2015

(86) PCT No.: PCT/EP2015/070325
§ 371 (c)(1),
(2) Date: Mar. 6, 2018

(87) PCT Pub. No.: WO2017/041813
PCT Pub. Date: Mar. 16, 2017

(65) Prior Publication Data
US 2019/0124658 A1 Apr. 25, 2019

(51) Int. Cl.
*H04W 52/08* (2009.01)
*H04L 5/00* (2006.01)
(Continued)

(52) U.S. Cl.
CPC ........ *H04W 52/08* (2013.01); *H04B 17/0085* (2013.01); *H04B 17/309* (2015.01);
(Continued)

(58) Field of Classification Search
CPC . H04W 52/08; H04W 24/06; H04W 72/0453; H04W 72/082
See application file for complete search history.

(56) References Cited

U.S. PATENT DOCUMENTS 5,754,961 A   5/1998 Serizawa et al.
7,502,341 B2  3/2009 Matoba et al.
(Continued)

FOREIGN PATENT DOCUMENTS

EP   2840840 A1   2/2015
WO   03049480 A1  6/2003

OTHER PUBLICATIONS

Lozano et al., Uplink-downlink imbalance in TDMA personal communication systems, Conference Date: Oct. 5-9, 1998 Date Added to IEEE Xplore: Aug. 6, 2002; Print ISBN: 0-7803-5106-1; Print ISSN: 1091-8442 (Year: 1998).*

(Continued)

*Primary Examiner* — Gary Mui
(74) *Attorney, Agent, or Firm* — Leffler Intellectual Property Law, PLLC (57) ABSTRACT

An UL carrier frequency or a downlink carrier frequency is adapted as a consequence of a determination that there is a difference in link budgets between uplink and downlink. Since a downlink provides a geographical coverage that is of a certain size, a lesser reliability of the uplink has a consequence that a mobile terminal may not be able to communicate when located far from a network node that transmits the downlink but still within the geographical coverage area of the downlink. Such drawbacks of present day wireless communication systems can be at least mitigated by embodiments of the present disclosure.

24 Claims, 6 Drawing Sheets

(51) Int. Cl.
*H04L 5/14* (2006.01)
*H04W 36/00* (2009.01)
*H04B 17/00* (2015.01)
*H04B 17/309* (2015.01)
*H04W 24/06* (2009.01)
*H04W 72/04* (2009.01)
*H04W 72/08* (2009.01)
*H04L 1/18* (2006.01)

(52) U.S. Cl.
CPC .............. *H04L 1/1864* (2013.01); *H04L 5/00* (2013.01); *H04L 5/14* (2013.01); *H04W 24/06* (2013.01); *H04W 36/00* (2013.01); *H04W 72/0453* (2013.01); *H04W 72/082* (2013.01)

(56) References Cited

U.S. PATENT DOCUMENTS

| | | | | |
|---|---|---|---|---|
| 2008/0285499 | A1* | 11/2008 | Zhang | H04B 7/155 370/315 |
| 2013/0136042 | A1* | 5/2013 | Chan | H04W 52/08 370/310 |
| 2013/0195058 | A1 | 8/2013 | Ode | |
| 2013/0235746 | A1 | 9/2013 | Patel et al. | |
| 2013/0301569 | A1 | 11/2013 | Wang et al. | |
| 2014/0064253 | A1* | 3/2014 | Deivasigamani | H04W 36/30 370/332 |
| 2015/0029844 | A1 | 1/2015 | Pathmasuntharam et al. | |
| 2016/0183243 | A1* | 6/2016 | Park | H04W 72/0413 370/329 |
| 2016/0227532 | A1* | 8/2016 | Azizi | H04L 69/22 |
| 2018/0020441 | A1* | 1/2018 | Lo | H04W 76/14 |

OTHER PUBLICATIONS

Ghosh et al., Uplink-Downlink Imbalance in Wireless Cellular Networks, Conference Date: Jun. 24-28, 2007 Date Added to IEEE Xplore: Aug. 13, 2007 Print ISBN: 1-4244-0353-7 (Year: 2007).*
PCT International Search Report, dated May 9, 2016, in connection with International Application No. PCT/EP2015/070325, all pages.
PCT Written Opinion, dated May 9, 2016, in connection with International Application No. PCT/EP2015/070325, all pages.

* cited by examiner

MITIGATION OF UPLINK/DOWNLINK ASSYMETRY

TECHNICAL FIELD

Embodiments herein relate to a wireless communication terminal and a network node in a wireless network and more specifically to controlling use of uplink and downlink radio carriers.

BACKGROUND

In many systems for wireless communications, a network node is communicating with one or more terminal nodes or terminals. The network nodes may be referred to as evolved Node B (eNB), base station (BS), Access Point (AP), etc. depending on which communication standard being discussed. Analogously, the terminal node may also be referred to as user equipment (UE), station (STA), etc. In the following the terms network node and terminal will be used as generic terms for such communicating entities.

In many situations, the network node is connected to the main power supply, whereas the terminal is battery powered. This means that power consumption typically is more of an issue for the terminal than it is for the network node. Another differentiating characteristic between a network node and a terminal is that it is typically possible to justify a considerably higher cost for the network node, allowing the use of components that support higher output power for a radio transmitter in the network node.

In summary, it is quite a common scenario that the network nodes have considerably higher output power than the output power of a terminal. Therefore, the downlink (DL), i.e. the radio link in the direction from the network node to the terminal, is often more reliable than the uplink (UL), i.e. the radio link in the direction from the terminal to the network node. This difference in reliability between the UL and DL has a consequence that, even if the DL provides a geographical coverage that is of a certain size, the lesser reliability of the UL has the consequence that a terminal may not be able to communicate when located far from the network node but still within the geographical coverage area of the DL. In other words, there is typically an asymmetry or imbalance between the coverage areas of the UL and the DL.

This asymmetry means that higher data rate can be supported in the DL than in the UL. However, what is even more of an issue is that often DL data needs to be acknowledged, i.e. an ACK message being transmitted in the UL that indicates to the network node that the data packet (data message) transmitted in the DL was correctly received by the terminal.

Typically, according to existing solutions, the above mentioned asymmetry in the capability of supporting high data rates in the DL and the UL is counteracted by using more robust modulation and coding scheme in the UL. However when the asymmetry is too large, the UL will still severely limit the coverage also for the DL.

US 2013/0235746 A1 describes a method in a node for selecting channels of different frequency bands in so-called femtocells. Criteria such as the location of the node in relation to a building are used in the selection of frequency bands.

SUMMARY

In view of the above, an object of the present disclosure is to overcome or at least mitigate at least some of the drawbacks related to asymmetry or imbalance between UL and DL in a wireless communication system.

This object is achieved in one aspect by a method in a first node in a wireless communication system. The first node has a connection with a second node in the wireless communication system via an UL at a current UL carrier frequency and via a DL at a current DL carrier frequency. The method comprises determining a current link budget for the UL and determining a current link budget for the DL. A current link budget difference is then calculated between the current link budget for the UL and the current link budget for the DL. If the current link budget difference is greater than a first threshold value, then an UL carrier balancing procedure is performed. The UL carrier balancing procedure comprises selecting a future UL carrier frequency for which the link budget difference value is below a second threshold value. The selection is based on the current link budget difference, the current UL carrier frequency and a predetermined set of possible future UL carrier frequencies. This selection is then followed by changing the current UL carrier frequency such that the current UL carrier frequency is equal to the selected future UL carrier frequency.

The object is achieved in another aspect by a method in a first node in a wireless communication system. The first node has a connection with a second node in the wireless communication system via an UL at a current UL carrier frequency and via a DL at a current DL carrier frequency. The method comprises determining a current link budget for the UL and determining a current link budget for the DL. A current link budget difference is then calculated between the current link budget for the UL and the current link budget for the DL. If the current link budget difference is greater than a first threshold value, then a DL carrier balancing procedure is performed. The DL carrier balancing procedure comprises selecting a future DL carrier frequency for which the link budget difference value is below a second threshold value. The selection is based on the current link budget difference, the current DL carrier frequency and a predetermined set of possible future DL carrier frequencies. This selection is then followed by changing the current DL carrier frequency such that the current DL carrier frequency is equal to the selected future DL carrier frequency.

That is, by adapting the UL carrier frequency or the DL carrier frequency as a consequence of a determination that there is a difference in link budgets between UL and DL, the drawbacks of present day wireless communication systems discussed above can be at least mitigated. Because the selection of a future UL or DL carrier frequency is based on the current link budget difference, the current UL or DL carrier frequency and a predetermined set of possible future UL or DL carrier frequencies, the selection can be viewed as using a model of how a change of UL or DL carrier frequency affects the link budgets.

Embodiments include those where the selected future UL carrier frequency is lower than the current DL carrier frequency and, correspondingly, where the selected future DL carrier frequency is higher than the current UL carrier frequency.

Embodiments include those where balancing of links as summarized above is performed only when needed. That is, such embodiments involve a determination whether or not any of the current link budget for the UL and the current link budget for the DL is below a second threshold. The UL or DL carrier balancing procedure is then performed only if it is determined that any of the current link budget for the UL and the current link budget for the DL is below the second threshold.

In other words, even if there is a difference in link budgets between UL and DL, there are situations where the balancing procedure is not necessary due to the simple fact that the UL is still capable of handling communication of data in a satisfactory manner.

In some embodiments, following a carrier balancing procedure performed in embodiments summarized above and when the first node acts in a role as a network node, a message may be transmitted on the current DL carrier frequency and receiving, on the current DL carrier frequency, an ACK message related to the transmitted message.

Correspondingly, acting as a terminal, the first node may receive a message on the current DL carrier frequency. Then, a determination is made whether or not an acknowledgement, ACK, message is to be transmitted relating to the received message, and if it is determined that an ACK message is to be transmitted, then transmitting the ACK on the current DL carrier frequency.

An advantage of such embodiments is that although the ACK message is in the UL direction, it is in many situations easier to allocate the channel for transmission in both directions at once. Specifically, in case the channel access is based on listen before talk (LBT), also referred to as carrier sense multiple access (CSMA), once the channel access is obtained for the actual data it can be reserved for a time long enough to also allow the ACK to be sent. Although this means that the link budget may be considerably worse for the ACK, the ACK may be sent using a significantly more robust modulation and coding scheme (MCS). Even if the more robust MCS means that the ACK packet will have a longer duration, the simplicity to allocate the channel may still result in an overall preferable solution.

In some embodiments, the bandwidth of the possible future UL carrier frequencies may be considered. That is, such embodiments may include a determination of a respective available bandwidth for the predetermined possible future UL carrier frequencies. A determination of a modulation and coding scheme, MCS, that is to be used in the connection via the UL may be determined and a respective required signal to noise, SNR, value may then be calculated based on the determined bandwidths and the determined MCS. The selection of a future UL carrier frequency may then further be based on these calculated required SNR values.

An advantage of such embodiments is that an increased bandwidth for the signal sent on the UL can be used to allow for a better link budget, thus giving additional flexibility concerning how to balance the UL and DL.

In some embodiments, following a carrier balancing procedure performed in embodiments summarized above and when the first node acts in a role as a terminal, a message may be received on the current DL carrier frequency. Then, a determination is made that an ACK message is to be transmitted. As a consequence of the determination that an ACK message is to be transmitted, a determination is made of a MCS of the received message on the current DL carrier frequency. Based at least in part on the determined MCS of the received message, a MCS for the ACK message is then determined and the ACK message is then transmitted on the current UL carrier frequency using the selected MCS.

An advantage of such embodiments is that the ACK message will be sent using a suitable MCS. Specifically, link adaptation is typically used to ensure that a suitable MCS is used for the data packet. If a fixed MCS is use for the ACK, this may either be unnecessary robust or it may not be robust enough.

Some embodiments involve a kind of negotiating procedure where the first node receives, from the second node, a plurality of test signals on a respective UL carrier frequency. A determination is then made of information that is indicative of path loss for the received test signals. The selection of a future UL carrier frequency is then further based on the information that is indicative of path loss for the received test signals.

An advantage of such embodiments is that the balancing of the UL and DL typically will be better. Although the path-loss can be estimated as a function of the used carrier frequency, it is a simplified model not taking specific deployments into account. By instead making measurements, the performance can often be improved at the expense of increased complexity.

Another aspect of the present disclosure is a first node for use in a wireless communication system. The first node is configured to have a connection with a second node in the wireless communication system via an at a current UL carrier frequency and via a DL at a current DL carrier frequency. The first node comprises radio frequency control circuitry, a processor and a memory. The memory contains instructions executable by the processor whereby the first node is operative to:
  determine a current link budget for the UL,
  determine a current link budget for the DL,
  calculate a current link budget difference between the current link budget for the UL and the current link budget for the DL,
  if the current link budget difference is greater than a first threshold value, then perform an UL carrier balancing procedure that comprises:
    select, based on the current link budget difference, the current UL carrier frequency and a predetermined set of possible future UL carrier frequencies, a future UL carrier frequency for which the link budget difference value is below a second threshold value, and
    change the current UL carrier frequency such that the current UL carrier frequency is equal to the selected future UL carrier frequency.

Another aspect of the present disclosure is a first node for use in a wireless communication system. The first node is configured to have a connection with a second node in the wireless communication system via an at a current UL carrier frequency and via a DL at a current DL carrier frequency. The first node comprises radio frequency control circuitry, a processor and a memory. The memory contains instructions executable by the processor whereby the first node is operative to:
  determine a current link budget for the UL,
  determine a current link budget for the DL,
  calculate a current link budget difference between the current link budget for the UL and the current link budget for the DL,
  if the current link budget difference is greater than a first threshold value, then perform a DL carrier balancing procedure that comprises:
    select, based on the current link budget difference, the current DL carrier frequency and a predetermined set of possible future DL carrier frequencies, a future DL carrier frequency for which the link budget difference value is below a second threshold value, and
    change the current DL carrier frequency such that the current DL carrier frequency is equal to the selected future DL carrier frequency.

In other aspects there are provided computer programs comprising instructions which, when executed on at least one processor in a first node, cause the first node to carry out the methods according to the aspects summarized above.

In other aspects there are provided carriers comprising a computer program according to the summarized aspects above, wherein the carrier is one of an electronic signal, an optical signal, a radio signal and a computer readable storage medium.

These other aspects provide the same effects and advantages as the method aspects summarized above.

DETAILED DESCRIPTION

Figure 1A:
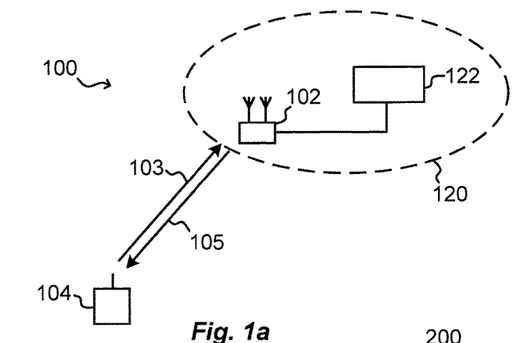
FIG. 1a schematically illustrate a wireless communication system.

FIG. 1a illustrates schematically a wireless communication system 100 that comprises a number of nodes. A first node 102 is in connection with a second node 104 via an air interface that comprises an uplink 103 and a downlink 105. As already mentioned, the uplink 103 is usually denoted UL and the downlink 105 is usually denoted DL. In FIG. 1, the first node 102 is in the form of a network node that may be in the form of a radio base station, access point etc. that belong to a more or less non-mobile part 120 of the wireless communication system 100 that may comprise one or more other nodes as illustrated by a node 122. The second node 104 is in the form of a terminal, a wireless communication device, a UE, a MTC device or the like that typically is a small mobile battery powered device.

Figure 1B:
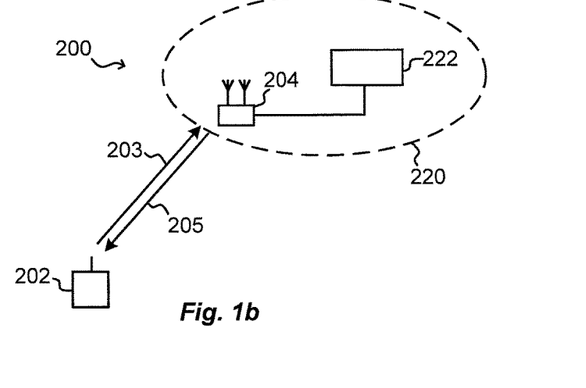
FIG. 1b schematically illustrate a wireless communication system.

FIG. 1b illustrates schematically a wireless communication system 200 that comprises a number of nodes. A first node 202 is in connection with a second node 204 via an air interface that comprises an uplink 203 and a downlink 205. In contrast to the example illustrated in FIG. 1a, in FIG. 1b the first node 202 is in the form of a terminal, a wireless communication device, a UE, a MTC device or the like that typically is a small mobile battery powered device. Correspondingly, the second node 204 is in the form of a network node that may be in the form of a radio base station, access point etc. that belong to a more or less non-mobile part 220 of the wireless communication system 200 that may comprise one or more other nodes as illustrated by a node 222.

The nodes in the wireless communication systems 100, 200 may be configured to communicate with each other according to a standard such as the third generation partnership project (3GPP) long term evolution (LTE) or an Institute of Electrical and Electronics Engineers (IEEE) 802.11 standard and also configured to operate to realize the embodiments that will be described in the following.

Figure 3A:
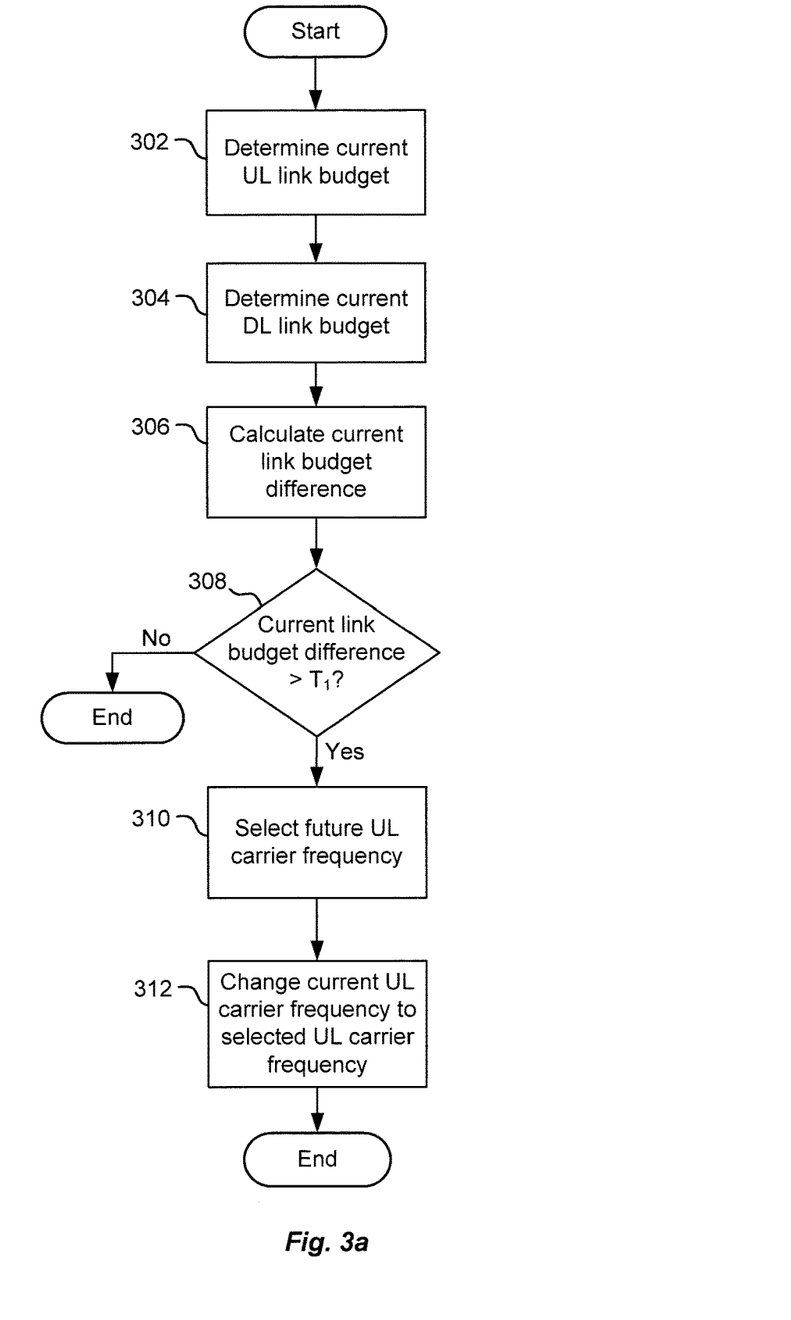
FIGS. 3a-h are flowcharts of embodiments of methods.

Turning now to FIG. 3a and with continued reference to FIGS. 1a and 1b, an embodiment of a method in the first node 102, 202 will be described in terms of a number of actions. As will be illustrated below in connection with embodiments of a node and a computer program, the actions of the method in FIG. 3a may be realized by way of software executed by a processor in the first node 102, 202. The first node 102, 202 has a connection with the second node 104, 204 in the wireless communication system 100, 200 via the UL 103, 203 at a current UL carrier frequency and via the DL 105, 205 at a current DL carrier frequency.

Action 302

A current link budget for the UL is determined.

Action 304

A current link budget for the DL is determined.

Action 306

A current link budget difference between the current link budget for the UL and the current link budget for the DL is calculated.

Action 308

A checking action is performed such that if the current link budget difference is greater than a first threshold value $T_1$, then an UL carrier balancing procedure is performed as specified in the following actions.

Action 310

The UL carrier balancing procedure comprises selecting, based on the current link budget difference, the current UL carrier frequency and a predetermined set of possible future UL carrier frequencies, a future UL carrier frequency for which the link budget difference value is below a second threshold value. Embodiments include those where the selected future UL carrier frequency is lower than the current DL carrier frequency.

Action 312

The UL carrier balancing procedure continues with changing the current UL carrier frequency such that the current UL carrier frequency is equal to the future UL carrier frequency selected in action 310.

Figure 3B:
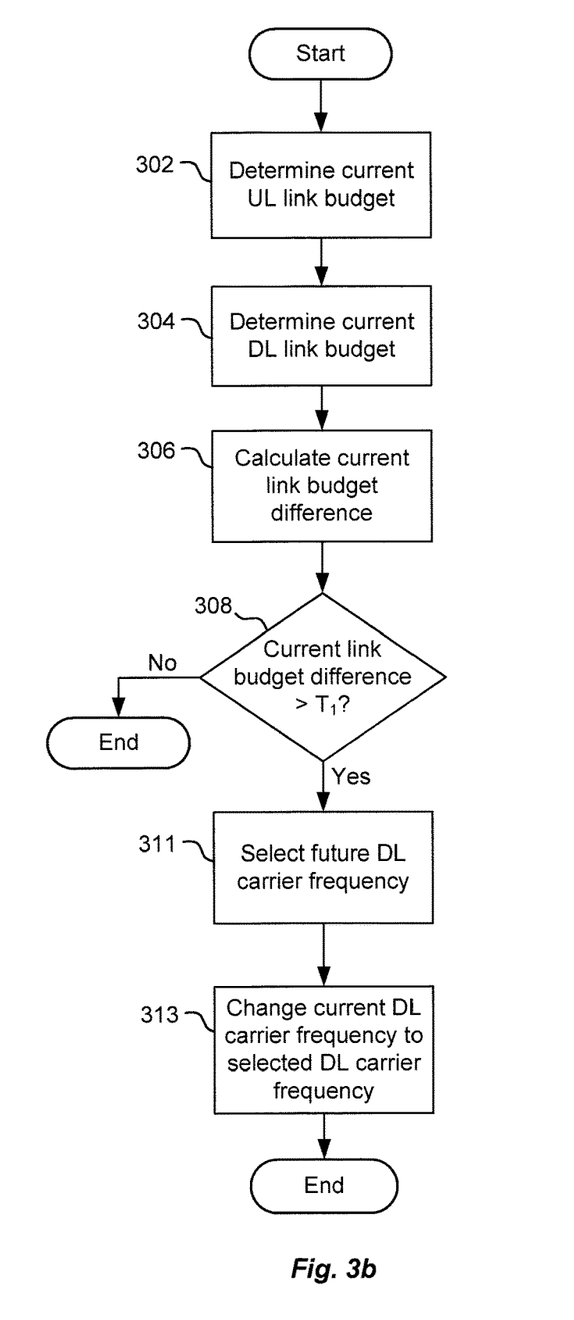

Turning now to FIG. 3b and with continued reference to FIGS. 1a and 1b, an embodiment of a method in the first node 102, 202 will be described in terms of a number of actions. As will be illustrated below in connection with embodiments of a node and a computer program, the actions of the method in FIG. 3a may be realized by way of software executed by a processor in the first node 102, 202. The first node 102, 202 has a connection with the second node 104, 204 in the wireless communication system 100, 200 via the UL 103, 203 at a current UL carrier frequency and via the DL 105, 205 at a current DL carrier frequency.

Action 302

A current link budget for the UL is determined.

Action 304

A current link budget for the DL is determined.

Action 306

A current link budget difference between the current link budget for the UL and the current link budget for the DL is calculated.

Action 308

A checking action is performed such that if the current link budget difference is greater than a first threshold value $T_1$, then a DL carrier balancing procedure is performed as specified in the following actions.

Action 311

The DL carrier balancing procedure comprises selecting, based on the current link budget difference, the current DL carrier frequency and a predetermined set of possible future DL carrier frequencies, a future DL carrier frequency for which the link budget difference value is below a second threshold value. Embodiments include those where the selected future DL carrier frequency is higher than the current UL carrier frequency.

Action 313

The DL carrier balancing procedure continues with changing the current DL carrier frequency such that the current DL carrier frequency is equal to the future DL carrier frequency selected in action 311.

As will be explained below, and with reference to FIG. 2, embodiments herein may be considered as counteracting asymmetry in transmit power by using different frequency bands for the UL and the DL, and where the frequency band used for the UL is at a lower carrier frequency. Often the available bandwidth is larger at higher frequencies. Therefore the present disclosure does also cover the adaptive approach that a switch to a situation where the UL or DL carrier balancing is only performed when needed.

A basic idea of embodiments in the present disclosure is to benefit from the fact that the propagation loss is lower at lower frequencies. Specifically, the free space path loss can be expressed as $$FSPL=20\ \log_{10}(4\pi df/c)$$

Where d is the distance between the transmitter and the receiver, f is the carrier frequency, and c is the speed of light in vacuum. With the carrier frequency in GHz and the distance in meters, this can be expressed as $$FSPL=20\ \log_{10}(f)+20\ \log_{10}(d)+32.45$$

In many cases, there is no line-of sight (LOS) between the transmitter and the receiver. In this case the path loss become larger and ca be modelled as $$PL=20\ \log_{10}(f)+1.0n\ \log_{10}(d)+32.45$$

Here reasonable values for n may be between 3 and 4.

To further exemplify, suppose that a network node (e.g. the first node 102 in FIG. 1a) has an output power of 30 dBm whereas the terminal (e.g. the second node 104 in FIG. 1a) has an output power of 20 dBm. Moreover, suppose that the receiver sensitivity for both the network node and the termina is −90 dBm, and that n in the path loss formula is 4. This corresponds to link budgets of 120 dB for the DL (e.g. DL 105 in FIG. 1a), but only 110 dB for the UL (e.g. UL 103 in FIG. 1a). Now consider FIG. 2 where the path loss is plotted as a function of distance. Suppose the system is an IEEE 802.11 system using 5 GHz carrier frequency. The range for the DL will then be about 70 m (the solid curve at 120 dB attenuation), whereas the range for the UL will be about 40 m (the solid curve at 110 dB attenuation). Thus the range for the system is determined by the range of the UL and is limited to 40 m.

Figure 2:
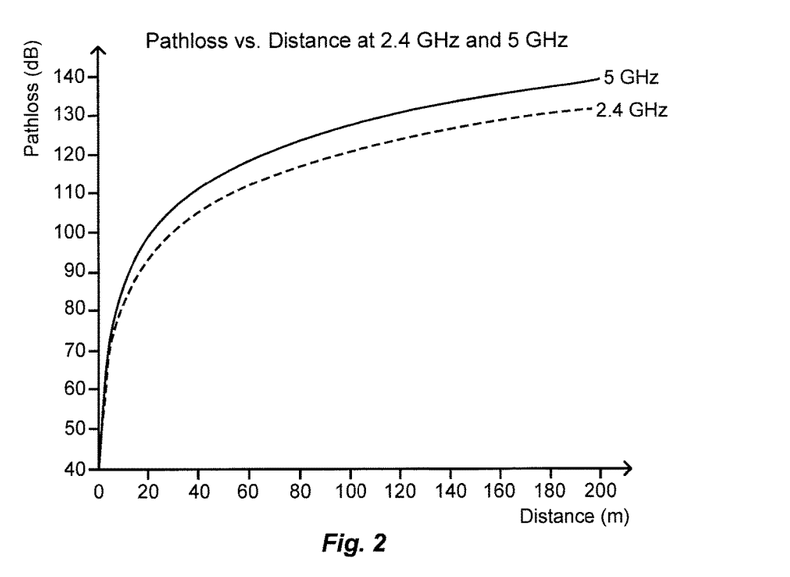
FIG. 2 is a diagram of path loss vs. distance.

If instead the system would have used 2.4 GHz, the range for the DL and the UL would have been 110 m and 55 m, respectively, as the dashed curve in FIG. 2 illustrates.

As FIG. 2 exemplifies, the separation in frequency between the UL and the DL may be changed to at least partly overcome the asymmetry of the coverage of the UL and the DL.

As an example, suppose that in a IEEE 802.11 Wi-Fi system the output power of the AP (i.e. a network node such as the first node 102 in FIG. 1a) is 30 dBm whereas the output power of a STA (i.e. a terminal such as the second node 104 in FIG. 1a) is 20 dBm. In order to compensate for this imbalance in output power, the AP decides to use the 2.4 GHz band for UL transmission and the 5 GHz Band for DL transmission. As in the example above, suppose that the sensitivity is −90 dBm. Using the 5 GHz band for the DL gives a range of 70 m and using the 2.4 GHz band for the UL gives a range of 55 m. So still it is the UL that limits the range, but the asymmetry has been significantly reduced compared to if the same frequency band would have been used for both UL and DL. It should be noted that in this example it was assumed that two frequency bands were available and that the UL and DL were placed in these. However, the present disclosure is not limited to scenarios with only two frequency bands. Conversely, if three of more frequency bands would be available, it would provide more flexibility in selecting suitable pair of frequency bands. The situation with three or more frequency bands to select from is also covered by the present disclosure. Another possibility is that the available frequency bands are very wide, so that the path loss is largely dependent on what part of the frequency band is used. If this being the situation, the part of the frequency band may be selected such that the UL and DL becomes as similar as possible considering the available TX power for the two links (i.e. UL and DL).

In the examples above, all UL transmissions were in one frequency band whereas all DL transmissions were in another band. In the examples, the UL transmissions were at the lower frequency as the output power of the UL transmitter was lower. In other examples, where the output power for the transmitter in the DL may be lower, the lower frequency would instead be selected for the DL.

In some systems, especially those that are under stringent control of the network node, having the DL and UL in two completely different bands would typically be feasible. However, for systems like Wi-Fi, where the channel access typically is of a more distributed nature this may cause some issues.

Note that in the examples above, the change of frequency separation between UL and DL includes the case that the system is using frequency division duplex (FDD) and that the duplex distance in changed, as well as the case that the system may be using both time division duplex (TDD) and FDD. Specifically, in case the system maybe using both TDD and FDD, a change of frequency separation may involve going from a frequency separation of zero (TDD) to a non-zero frequency separation (FDD).

Figure 3C:
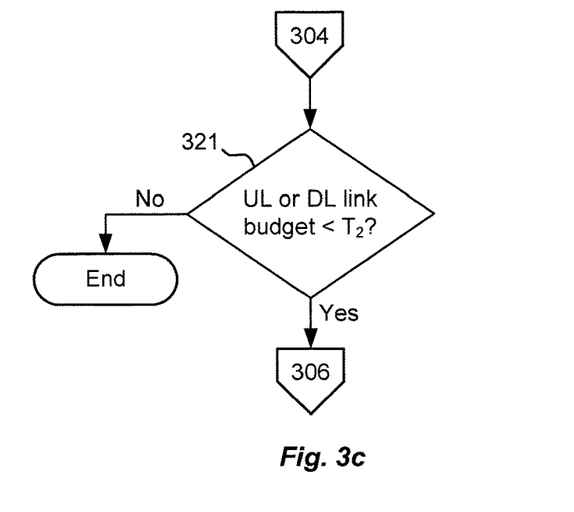

As illustrated in FIG. 3c, a further condition may be imposed before any of the UL and DL carrier balancing procedure is performed. Although a goal of embodiments in the present disclosure involve balancing UL and DL link budgets by various means, some embodiments may involve doing this balancing only if found that it is necessary. As an example, suppose that at an IEEE 802.11 Wi-Fi link is at 5 GHz, and that the imbalance between the UL and the DL link budget is 10 dB due to different output powers of the UL transmitter and the DL transmitter located in the respective communicating node. As exemplified herein, according to some of the embodiments, such imbalance may be reduced by moving the UL to another frequency band, such as the IEEE 802.11 2.4 GHz band. However, in many situations the performance of the UL is still satisfactory. That is, although there may be a significant imbalance between the UL and DL link budget, the UL is still good enough. Therefore, as an additional feature applicable to embodiments herein, a balancing of the UL and the DL may be made only in case it is found needed.

Such embodiments may comprise a number of actions as follows:

Action 321

A determination is made whether or not any of the current link budget for the UL and the current link budget for the DL is below a second threshold. The UL or DL carrier balancing procedure is performed only if it is determined that any of the current link budget for the UL and the current link budget for the DL is below the second threshold.

As exemplified in FIG. 3c, this determination action 321 may be performed prior to the calculation of the link budget difference in action 306. However, the determination action 321 may in some embodiments be performed subsequent to action 306.

Figure 3D:
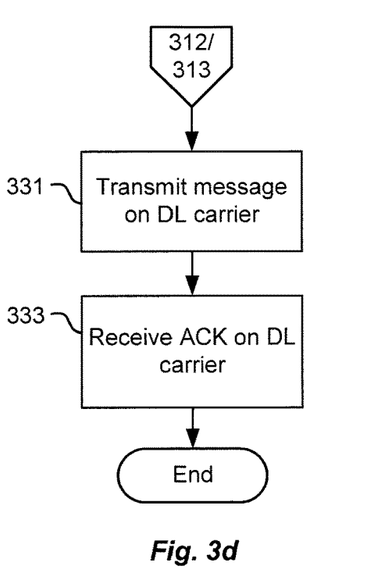
Figure 3E:
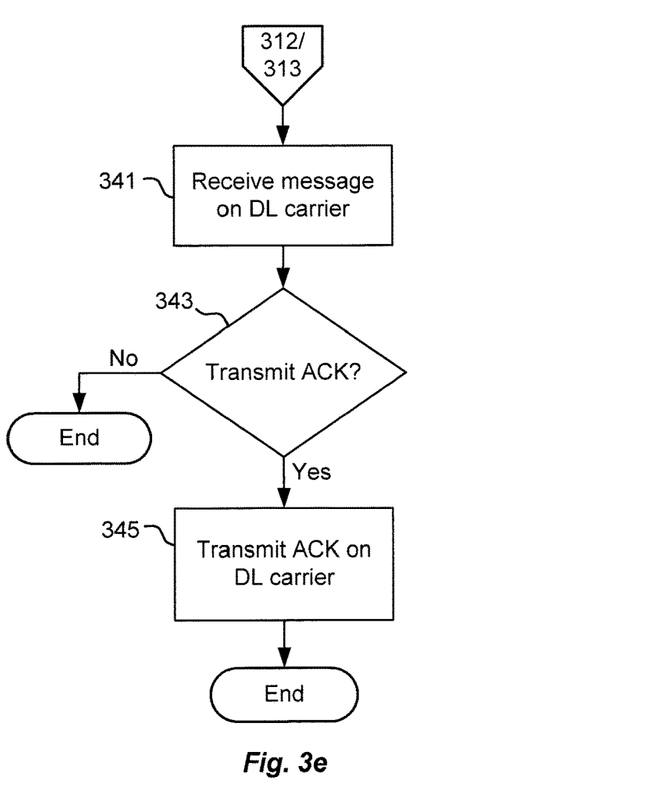

As illustrated in FIG. 3d and FIG. 3e, some embodiments in the present disclosure may involve scenarios involving ACK messages. Similar to the example embodiments described above, in these embodiments involving ACK transmissions, data messages in the UL and the DL are transmitted in different frequency bands. However, in these example embodiments, ACK responses to respective data messages are transmitted in the same frequency band as the data message itself. In these embodiments, the imbalance is thus only compensated for the transmission of data messages. However, as ACK responses typically are transmitted using considerably more robust coding and modulation, it is typically feasible to have an imbalance in the link budget for the two links, UL and DL. These embodiments are suitable for systems like IEEE 802.11, where the transmitter of data messages has to contend for the channel and only if the channel is found to be idle can the data message be transmitted, and where the ACK message is sent as a response to the data message and where the transmitter of the ACK message does not need to contend for the channel.

FIG. 3d exemplifies actions performed by a network node acting as a first node, e.g. a scenario as illustrated in FIG. 1a where the first node 102 is a network node.

It is to be noted that the use of the expression "message" is to be interpreted as being equivalent with "data message" and that a message that comprises ACK (acknowledge) information associated with the "data message" is denoted "ACK message".

Action 331

The first node, transmits a message on the current DL carrier frequency.

Action 333

The first node receives on the current DL carrier frequency, an ACK message that is related to the message transmitted in action 331.

FIG. 3e illustrates actions performed by a terminal acting as a first node, e.g. a scenario as illustrated in FIG. 1b where the first node 202 is a terminal.

Action 341

A message is received on the current DL carrier frequency.

Action 343

A determination is made whether or not an ACK message is to be transmitted relating to the message received in action 341.

Action 345

If it is determined, in action 343, that an ACK message is to be transmitted, then the ACK message is transmitted on the current DL carrier frequency.

Figure 3F:
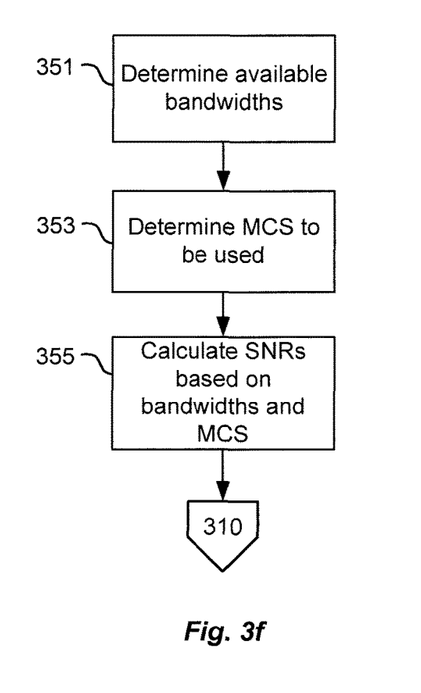

As illustrated in FIG. 3f, some embodiments in the present disclosure may involve considerations relating to available bandwidth. That is, in the embodiments discussed above, a goal has been to as much as possible get the link budgets for the UL and DL as similar as possible. However, one of the very reasons for utilizing higher frequencies is that there usually are more spectra available at higher frequencies. For example, the 2.4 GHz industrial, scientific and medical (ISM) band used for IEEE802.11 Wi-Fi is about 80 MHz wide, whereas the bands at 5 GHz used for IEEE802.11 Wi-Fi are in total several hundreds of MHz. Going up to the bands around 60 GHz, there are as much as 7 GHz available bandwidth.

As a larger bandwidth can be used to reduce the required SNR, by essentially trading bandwidth efficiency with power efficiency, some embodiments may relate to trying to balancing link budgets for the UL and the DL while also taking the available bandwidth into consideration.

In such embodiments, in addition to taking different output powers into consideration, also the effective SNR needed for the reception is considered to balance the link budgets. As an example, consider IEEE 802.11 Wi-Fi, and suppose that the channel that can be used is 4 times wider in the 5 GHz band than it is in the 2.4 GHz band, say 80 MHz in the 5 GHz and 20 MHz in the 2.4 GHz band. Moreover, consider supporting a data rate of 52 Mb/s using 2×2 multiple input-multiple output (MIMO). In case of 20 MHz channel this requires 16-quadrature amplitude modulation (QAM) and r=½ coding, whereas in case of an 80 MHz channel the same data rate can be obtained by instead using binary phase-shift keying (BPSK) and r=½ coding. The required SNR for BPSK is 1 dB at a packet error rate (PER) of 10%, whereas the required SNR for 16-QAM is about 10 dB. As the bandwidth for 16-QAM is 4 times smaller, the noise power is also 4 times smaller, i.e. 6 dB. Thus, effectively using the 80 MHz channel allows for a net gain in link budget by 10−1−6=3 dB.

It is known that for a highly asymmetric link, i.e. where the UL and DL link budgets are very different, it may be the ACK that is the limiting factor, i.e., it is the ACK that effectively limits the coverage as although the data packet is correctly received, this will not be known for the AP as the corresponding ACK is not received. In 802.11, the ACK is therefore sent using a more robust MCS than the actual data message. However, using a unnecessary robust ACK packet results in decreased efficiency. Therefore, the MCS used for an ACK message may be made dependent on the MCS used for the data message so that the lowest MCS is used for the ACK if the used MCS for the data message is below a certain threshold, and a higher MCS is used for the ACK in case the MCS for the data message is above the same threshold. Depending on the asymmetry between the UL and the DL this extra margin added to the ACK message may or may not be sufficient. In fact it has been found in practice that when the MCS used for data is only slightly above the MCS used for the ACK message, say corresponding to 5 dB, it is not sufficient when the asymmetry of the two links is significant, say 15 dB.

Such embodiments are illustrated in FIG. 3f where a first node, in the form of a network node or a terminal, may perform a number of actions as follows.

Action 351

A respective available bandwidth for the predetermined possible future UL carrier frequencies is determined.

Action 353

A modulation and coding scheme, MCS, that is to be used in the connection via the UL is then determined.

Action 355

A respective required signal to noise, SNR, value is calculated based on the determined bandwidths and the determined MCS. The selection of a future UL carrier frequency, in action 310, is then further based on the calculated required SNR values.

Figure 3G:
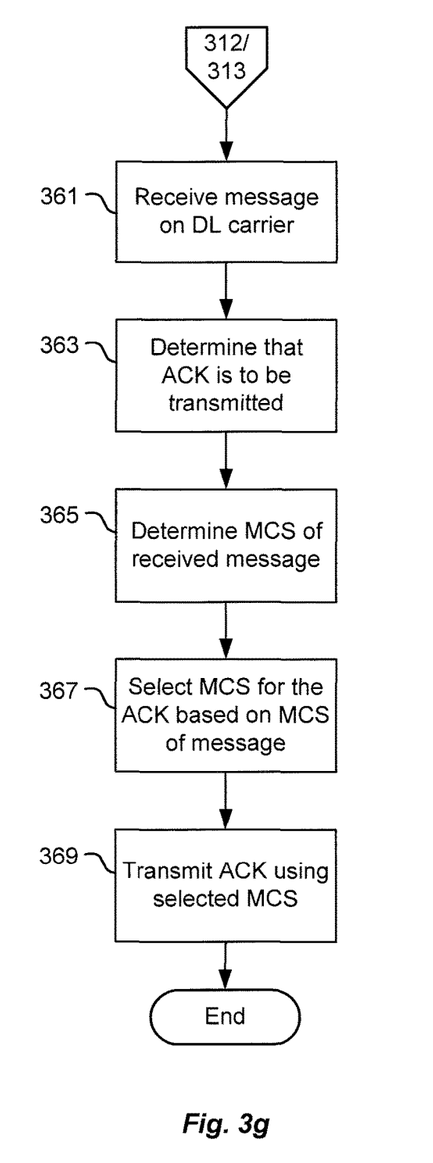

As illustrated in FIG. 3g, some embodiments in the present disclosure may involve selecting the MCS for an ACK message in a more generalized way. That is, a matching is made of the ACK MCS to the MCS of data messages, including knowledge about the link budget difference. Specifically, the MCS for the ACK is selected based on the MCS used for the data plus the difference in path loss obtained from using different frequency bands for the data and the ACK.

In FIG. 3g, such embodiments are illustrated by a number of actions performed by a terminal that is acting as a first node, e.g. a scenario such as that illustrated in FIG. 1b where the first node 202 is a terminal:

Action 361

A message is received on the current DL carrier frequency.

Action 363

A determination is made that an ACK message is to be transmitted.

Action 365

As a consequence of the determination that an ACK message is to be transmitted, a determination is made of a MCS of the received message on the current DL carrier frequency, Action 367

Based at least in part on the determined MCS of the received message, a selection is made of a MCS for the ACK message.

Action 369

The ACK message is then transmitted on the current UL carrier frequency using the selected MCS.

Figure 3H:
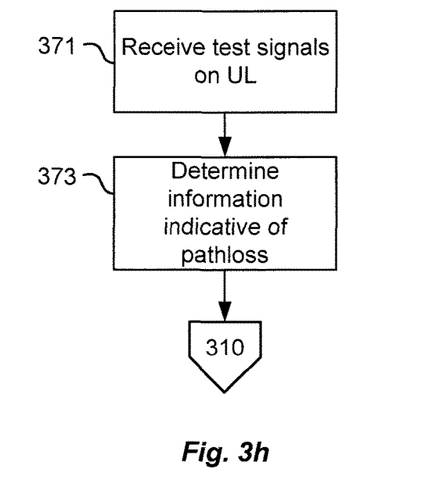

As illustrated in FIG. 3h, some embodiments in the present disclosure may involve negotiation between a terminal and a network node regarding which carrier to use for the UL. For example, considering a scenario where an original connection setup is made on >10 GHz and the current radio environment is measured giving an indication of the link budget imbalance. The terminal then performs measurements on possible sub 10 GHz carriers to find the UL path loss for these available carriers. Such measurements may, e.g., be done by beacon signaling from the terminal for the network node to measure on. Based on information on path loss for different UL carriers, the (e.g. highest) possible UL carrier frequency giving sufficient small link budget imbalance may be chosen for continued UL communication.

In FIG. 3h, such embodiments are illustrated by a number of actions performed by a network node that is acting as a first node, e.g. a scenario such as that illustrated in FIG. 1a where the first node 102 is a network node:

Action 371

A plurality of test signals is received from the second node on a respective UL carrier frequency.

Action 373

A determination is made of information that is indicative of path loss for the received test signals. The selection of a future UL carrier frequency, in action 310, is then further based on the information that is indicative of path loss for the received test signals.

Figure 4A:
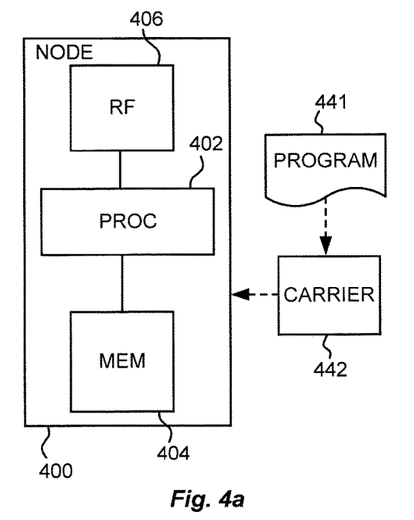
FIGS. 4a-b schematically illustrate block diagrams of nodes.

Turning now to FIG. 4a, example embodiments of a first node 400, e.g. a first node such as the first node 102 in FIG. 1a or the first node 202 in FIG. 1b, will be illustrated in some more detail. It is to be noted that in FIG. 4a, the first node 400 is denoted "node".

The first node 400 is for use in a wireless communication system 100, 200 and the first node 400 is configured to have a connection with a second node 104, 204 in the wireless communication system 100, 200 via an UL 103, 203 at a current UL carrier frequency and via a DL 105, 205 at a current DL carrier frequency. The first node 400 comprises radio frequency control circuitry 406, a processor 402 and a memory 404. The memory 404 contains instructions executable by the processor 402 whereby the first node 400 is operative to:

determine a current link budget for the UL,
determine a current link budget for the DL,
calculate a current link budget difference between the current link budget for the UL and the current link budget for the DL,
if the current link budget difference is greater than a first threshold value, then perform an UL carrier balancing procedure that comprises:
  select, based on the current link budget difference, the current UL carrier frequency and a predetermined set of possible future UL carrier frequencies, a future UL carrier frequency for which the link budget difference value is below a second threshold value, and
  change the current UL carrier frequency such that the current UL carrier frequency is equal to the selected future UL carrier frequency.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

Figure 4B:
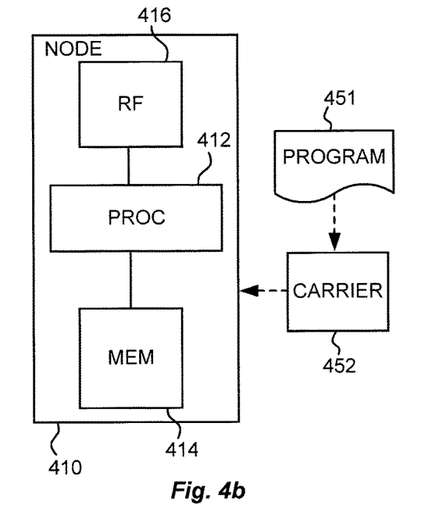

Turning now to FIG. 4b, example embodiments of a first node 410, e.g. a first node such as the first node 102 in FIG. 1a or the first node 202 in FIG. 1b, will be illustrated in some more detail. It is to be noted that in FIG. 4b, the first node 410 is denoted "node".

The first node 410 is for use in a wireless communication system 100, 200 and the first node 410 is configured to have a connection with a second node 104, 204 in the wireless communication system 100, 200 via an UL 103, 203 at a current UL carrier frequency and via a DL 105, 205 at a current DL carrier frequency. The first node 410 comprises radio frequency control circuitry 416, a processor 412 and a memory 414. The memory 414 contains instructions executable by the processor 412 whereby the first node 410 is operative to:

determine a current link budget for the UL,
determine a current link budget for the DL,
calculate a current link budget difference between the current link budget for the UL and the current link budget for the DL,
if the current link budget difference is greater than a first threshold value, then perform an UL carrier balancing procedure that comprises:
  select, based on the current link budget difference, the current UL carrier frequency and a predetermined set of possible future UL carrier frequencies, a future UL carrier frequency for which the link budget difference value is below a second threshold value, and
  change the current UL carrier frequency such that the current UL carrier frequency is equal to the selected future UL carrier frequency.

The instructions that are executable by the processor 412 may be software in the form of a computer program 451. The computer program 451 may be contained in or by a carrier 452, which may provide the computer program 451 to the memory 414 and processor 412. The carrier 452 may be in any suitable form including an electronic signal, an optical signal, a radio signal or a computer readable storage medium.

In some embodiments, the first node 400 is operative such that the selected future UL carrier frequency is lower than the current DL carrier frequency.

In some embodiments, the first node 410 is operative to:
determine whether or not any of the current link budget for the UL and the current link budget for the DL is below a second threshold, and operative such that:
the UL carrier balancing procedure is performed only if it is determined that any of the current link budget for the UL and the current link budget for the DL is below the second threshold.

In some embodiments, the first node 410 is operative such that the selected future DL carrier frequency is higher than the current UL carrier frequency.

In some embodiments, the first node 410 is operative to:
determine whether or not any of the current link budget for the UL and the current link budget for the DL is below a second threshold, and operative such that:
the DL carrier balancing procedure is performed only if it is determined that any of the current link budget for the UL and the current link budget for the DL is below the second threshold.

In some embodiments, the first node 400, 410 is operative to:
transmit a message on the current DL carrier frequency, and
receive, on the current DL carrier frequency, an ACK message related to the transmitted message.

In some embodiments, the first node 400, 410 is operative to:
receive a message on the current DL carrier frequency,
determine whether or not an acknowledgement, ACK, message is to be transmitted relating to the received message, and
if it is determined that an ACK message is to be transmitted, then transmit the ACK on the current DL carrier frequency.

In some embodiments, the first node 400 is operative to:
determine a respective available bandwidth for the predetermined possible future UL carrier frequencies,
determine a modulation and coding scheme, MCS, that is to be used in the connection via the UL,
calculate a respective required signal to noise, SNR, value based on the determined bandwidths and the determined MCS, and operative such that:
the selection of a future UL carrier frequency is further based on the calculated required SNR values.

In some embodiments, the first node 400, 410 is operative to:
receive a message on the current DL carrier frequency,
determine that an ACK message is to be transmitted and, as a consequence of the determination that an ACK message is to be transmitted,
determine a MCS of the received message on the current DL carrier frequency,
select, based at least in part on the determined MCS of the received message, a MCS for the ACK message, and
transmit the ACK message on the current UL carrier frequency using the selected MCS.

In some embodiments, the first node 400 is operative to:
receive, from the second node, a plurality of test signals on a respective UL carrier frequency,
determine information that is indicative of path loss for the received test signals, and operative such that:
the selection of a future UL carrier frequency is further based on the information that is indicative of path loss for the received test signals.

Figure 5A:
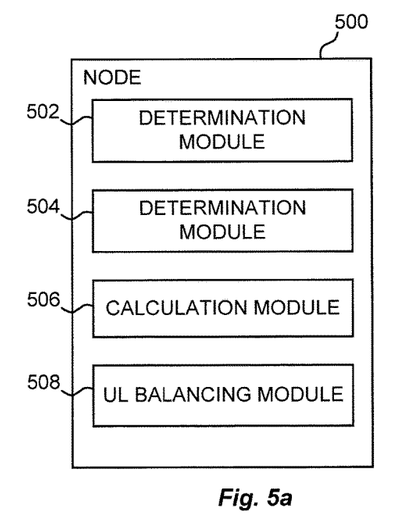
FIGS. 5a-b schematically illustrate block diagrams of nodes.

Turning now to FIG. 5a, example embodiments of a first node 500, e.g. a first node such as the first node 102 in FIG. 1a or the first node 202 in FIG. 1b, will be illustrated in some more detail. It is to be noted that in FIG. 5, the first node 500 is denoted "node".

The first node 500 is for use in a wireless communication system 100, 200 and the first node 500 is configured to have a connection with a second node 104, 204 in the wireless communication system 100, 200 via an UL 103, 203 at a current UL carrier frequency and via a DL 105, 205 at a current DL carrier frequency. The first node 500 comprises:
a determination module 502 configured to determine a current link budget for the UL,
a determination module 504 configured to determine a current link budget for the DL,
a calculation module 506 configured to calculate a current link budget difference between the current link budget for the UL and the current link budget for the DL,
a balancing 508 module configured to, if the current link budget difference is greater than a first threshold value, perform an UL carrier balancing procedure that comprises:
select, based on the current link budget difference, the current UL carrier frequency and a predetermined set of possible future UL carrier frequencies, a future UL carrier frequency for which the link budget difference value is below a second threshold value, and
change the current UL carrier frequency such that the current UL carrier frequency is equal to the selected future UL carrier frequency.

The first node 500 may comprise further modules that are configured to perform in a similar manner as, e.g., the first node 400 described above in connection with FIG. 4a.

Figure 5B:
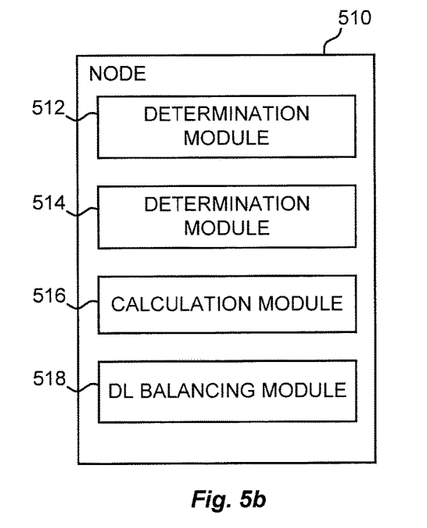

Turning now to FIG. 5b, example embodiments of a first node 510, e.g. a first node such as the first node 102 in FIG. 1a or the first node 202 in FIG. 1b, will be illustrated in some more detail. It is to be noted that in FIG. 5a, the first node 510 is denoted "node".

The first node 510 is for use in a wireless communication system 100, 200 and the first node 510 is configured to have a connection with a second node 104, 204 in the wireless communication system 100, 200 via an UL 103, 203 at a current UL carrier frequency and via a DL 105, 205 at a current DL carrier frequency. The first node 510 comprises:
a determination module 512 configured to determine a current link budget for the UL,
a determination module 514 configured to determine a current link budget for the DL,
a calculation module 516 configured to calculate a current link budget difference between the current link budget for the UL and the current link budget for the DL,
a balancing 518 module configured to, if the current link budget difference is greater than a first threshold value, perform an DL carrier balancing procedure that comprises:
select, based on the current link budget difference, the current DL carrier frequency and a predetermined set of possible future DL carrier frequencies, a future DL carrier frequency for which the link budget difference value is below a second threshold value, and
change the current DL carrier frequency such that the current DL carrier frequency is equal to the selected future DL carrier frequency.

The first node 510 may comprise further modules that are configured to perform in a similar manner as, e.g., the first node 410 described above in connection with FIG. 4b.

The invention claimed is:

1. A method in a first node in a wireless communication system, the first node having a connection with a second node in the wireless communication system via an uplink, at a current UL carrier frequency and via a downlink (DL), at a current DL carrier frequency, the method comprising:
   determining a current link budget for the UL;
   determining a current link budget for the DL;
   calculating a current link budget difference between the current link budget for the UL and the current link budget for the DL;
   if the current link budget difference is greater than a first threshold value, then performing an UL carrier balancing procedure that comprises:
      selecting, based on the current link budget difference, the current UL carrier frequency and a predetermined set of possible future UL carrier frequencies, a future UL carrier frequency for which the link budget difference value is below a second threshold value; and
      changing the current UL carrier frequency such that the current UL carrier frequency is equal to the selected future UL carrier frequency.

2. The method of claim 1, wherein the selected future UL carrier frequency is lower than the current DL carrier frequency.

3. The method of claim 1, comprising:
   determining whether or not any of the current link budget for the UL and the current link budget for the DL is below a second threshold, and wherein:
   the UL carrier balancing procedure is performed only if it is determined that any of the current link budget for the UL and the current link budget for the DL is below the second threshold.

4. The method of claim 1, comprising:
   transmitting a message on the current DL carrier frequency; and
   receiving, on the current DL carrier frequency, an ACK message related to the transmitted message.

5. The method of claim 1, comprising:
   receiving a message on the current DL carrier frequency;
   determining whether or not an acknowledgement (ACK) message is to be transmitted relating to the received message; and
   if it is determined that an ACK message is to be transmitted, then transmitting the ACK on the current DL carrier frequency.

6. The method of claim 1, comprising:
   determining a respective available bandwidth for the predetermined possible future UL carrier frequencies;
   determining a modulation and coding scheme (MCS) that is to be used in the connection via the UL; and
   calculating a respective required signal to noise ratio (SNR) value based on the determined bandwidths and the determined MCS, and wherein:
   the selection of a future UL carrier frequency is further based on the calculated required SNR values.

7. The method of claim 1, comprising:
   receiving a message on the current DL carrier frequency;
   determining that an ACK message is to be transmitted and, as a consequence of the determination that an ACK message is to be transmitted;
   determining a MCS of the received message on the current DL carrier frequency;
   selecting, based at least in part on the determined MCS of the received message, a MCS for the ACK message; and
   transmitting the ACK message on the current UL carrier frequency using the selected MCS.

8. The method of claim 1, comprising:
   receiving, from the second node, a plurality of test signals on a respective UL carrier frequency; and
   determining information that is indicative of path loss for the received test signals, and wherein:
   the selection of a future UL carrier frequency is further based on the information that is indicative of path loss for the received test signals.

9. A method in a first node in a wireless communication system, the first node having a connection with a second node in the wireless communication system via an uplink (UL), at a current UL carrier frequency and via a downlink (DL) at a current DL carrier frequency, the method comprising:
   determining a current link budget for the UL;
   determining a current link budget for the DL;
   calculating a current link budget difference between the current link budget for the UL and the current link budget for the DL;
   if the current link budget difference is greater than a first threshold value, then performing a DL carrier balancing procedure that comprises:
      selecting, based on the current link budget difference, the current DL carrier frequency and a predetermined set of possible future DL carrier frequencies, a future DL carrier frequency for which the link budget difference value is below a second threshold value; and
      changing the current DL carrier frequency such that the current DL carrier frequency is equal to the selected future DL carrier frequency.

10. The method of claim 9, wherein the selected future DL carrier frequency is higher than the current UL carrier frequency.

11. The method of claim 9, comprising:
    determining whether or not any of the current link budget for the UL and the current link budget for the DL is below a second threshold, and wherein:
    the DL carrier balancing procedure is performed only if it is determined that any of the current link budget for the UL and the current link budget for the DL is below the second threshold.

12. A first node for use in a wireless communication system, the first node configured to have a connection with a second node in the wireless communication system via an uplink (UL) at a current UL carrier frequency and via a downlink (DL) at a current DL carrier frequency, the first node comprising radio frequency control circuitry, a processor and a memory, said memory containing instructions executable by said processor whereby said first node is operative to:
    determine a current link budget for the UL;
    determine a current link budget for the DL;
    calculate a current link budget difference between the current link budget for the UL and the current link budget for the DL;
    if the current link budget difference is greater than a first threshold value, then perform an UL carrier balancing procedure that comprises:
       select, based on the current link budget difference, the current UL carrier frequency and a predetermined set of possible future UL carrier frequencies, a future UL carrier frequency for which the link budget difference value is below a second threshold value; and change the current UL carrier frequency such that the current UL carrier frequency is equal to the selected future UL carrier frequency.

13. The first node of claim 12, operative such that the selected future UL carrier frequency is lower than the current DL carrier frequency.

14. The first node of claim 12, operative to:
determine whether or not any of the current link budget for the UL and the current link budget for the DL is below a second threshold, and operative such that:
the UL carrier balancing procedure is performed only if it is determined that any of the current link budget for the UL and the current link budget for the DL is below the second threshold.

15. The first node of claim 12, operative to:
transmit a message on the current DL carrier frequency; and
receive, on the current DL carrier frequency, an ACK message related to the transmitted message.

16. The first node of claim 12, operative to:
receive a message on the current DL carrier frequency;
determine whether or not an acknowledgement (ACK) message is to be transmitted relating to the received message; and
if it is determined that an ACK message is to be transmitted, then transmit the ACK on the current DL carrier frequency.

17. The first node of claim 12, operative to:
determine a respective available bandwidth for the predetermined possible future UL carrier frequencies;
determine a modulation and coding scheme, MCS, that is to be used in the connection via the UL;
calculate a respective required signal to noise ratio (SNR) value based on the determined bandwidths and the determined MCS, and operative such that:
the selection of a future UL carrier frequency is further based on the calculated required SNR values.

18. The first node of claim 12, operative to:
receive a message on the current DL carrier frequency;
determine that an ACK message is to be transmitted and, as a consequence of the determination that an ACK message is to be transmitted;
determine a MCS of the received message on the current DL carrier frequency;
select, based at least in part on the determined MCS of the received message, a MCS for the ACK message; and
transmit the ACK message on the current UL carrier frequency using the selected MCS.

19. The first node of claim 12, operative to:
receive, from the second node, a plurality of test signals on a respective UL carrier frequency;
determine information that is indicative of path loss for the received test signals, and operative such that:
the selection of a future UL carrier frequency is further based on the information that is indicative of path loss for the received test signals.

20. A first node for use in a wireless communication system, the first node configured to have a connection with a second node in the wireless communication system via an uplink (UL) at a current UL carrier frequency and via a downlink (DL) at a current DL carrier frequency, the first node comprising radio frequency control circuitry, a processor and a memory, said memory containing instructions executable by said processor whereby said first node is operative to:
determine a current link budget for the UL;
determine a current link budget for the DL;
calculate a current link budget difference between the current link budget for the UL and the current link budget for the DL;
if the current link budget difference is greater than a first threshold value, then perform a DL carrier balancing procedure that comprises:
select, based on the current link budget difference, the current DL carrier frequency and a predetermined set of possible future DL carrier frequencies, a future DL carrier frequency for which the link budget difference value is below a second threshold value; and
change the current DL carrier frequency such that the current DL carrier frequency is equal to the selected future DL carrier frequency.

21. The first node of claim 20, operative such that the selected future DL carrier frequency is higher than the current UL carrier frequency.

22. The first node of claim 20, operative to:
determine whether or not any of the current link budget for the UL and the current link budget for the DL is below a second threshold, and operative such that:
the DL carrier balancing procedure is performed only if it is determined that any of the current link budget for the UL and the current link budget for the DL is below the second threshold.

23. A non-transitory computer readable storage medium comprising computer program instructions which, when executed on at least one processor in a first node, cause the first node to carry out a method in a wireless communication system, the first node having a connection with a second node in the wireless communication system via an uplink (UL) at a current UL carrier frequency and via a downlink (DL) at a current DL carrier frequency, the method comprising:
determining a current link budget for the UL;
determining a current link budget for the DL;
calculating a current link budget difference between the current link budget for the UL and the current link budget for the DL;
if the current link budget difference is greater than a first threshold value, then performing an UL carrier balancing procedure that comprises:
selecting, based on the current link budget difference, the current UL carrier frequency and a predetermined set of possible future UL carrier frequencies, a future UL carrier frequency for which the link budget difference value is below a second threshold value; and
changing the current UL carrier frequency such that the current UL carrier frequency is equal to the selected future UL carrier frequency.

24. A non-transitory computer readable storage medium comprising computer program instructions which, when executed on at least one processor in a first node, cause the first node to carry out a method in a wireless communication system, the first node having a connection with a second node in the wireless communication system via an uplink (UL) at a current UL carrier frequency and via a downlink (DL) at a current DL carrier frequency, the method comprising:
determining a current link budget for the UL;

determining a current link budget for the DL;
calculating a current link budget difference between the current link budget for the UL and the current link budget for the DL;
if the current link budget difference is greater than a first threshold value, then performing a DL carrier balancing procedure that comprises:
  selecting, based on the current link budget difference, the current DL carrier frequency and a predetermined set of possible future DL carrier frequencies, a future DL carrier frequency for which the link budget difference value is below a second threshold value; and
  changing the current DL carrier frequency such that the current DL carrier frequency is equal to the selected future DL carrier frequency.

* * * * *